US010150242B2

United States Patent
Ogihara et al.

(10) Patent No.: US 10,150,242 B2
(45) Date of Patent: Dec. 11, 2018

(54) MOLD FOR CONTAINER WITH HANDLE

(71) Applicant: NISSEI ASB MACHINE CO., LTD., Komoro-shi, Nagano (JP)

(72) Inventors: Shuichi Ogihara, Komoro (JP); Kazuyuki Yokobayashi, Komoro (JP); Masayuki Usami, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 579 days.

(21) Appl. No.: 14/651,603

(22) PCT Filed: Dec. 11, 2013

(86) PCT No.: PCT/JP2013/083258
§ 371 (c)(1),
(2) Date: Jun. 11, 2015

(87) PCT Pub. No.: WO2014/092135
PCT Pub. Date: Jun. 19, 2014

(65) Prior Publication Data
US 2015/0328818 A1    Nov. 19, 2015

(30) Foreign Application Priority Data

Dec. 14, 2012    (JP) ................................ 2012-273516

(51) Int. Cl.
*B29C 49/20*      (2006.01)
*B65D 23/10*      (2006.01)
(Continued)

(52) U.S. Cl.
CPC .............. *B29C 49/20* (2013.01); *B29C 49/48* (2013.01); *B65D 1/0223* (2013.01); *B65D 1/48* (2013.01);
(Continued)

(58) Field of Classification Search
CPC ... B29C 49/20; B29C 49/48; B29C 2049/481; B29C 49/06; B29C 2049/4807;
(Continued)

(56) References Cited

U.S. PATENT DOCUMENTS 4,257,525 A * 3/1981 Thompson ........... B65D 23/102
                                                      215/396
4,273,246 A * 6/1981 Thompson .............. B29C 49/54
                                                      215/398
(Continued)

FOREIGN PATENT DOCUMENTS

CN        1564736 A     1/2005
CN      101743170 A     6/2010
(Continued)

OTHER PUBLICATIONS

International Search Report dated Mar. 11, 2014, Application No. PCT/JP2013/083258.
(Continued)

*Primary Examiner* — Ernesto Grano
(74) *Attorney, Agent, or Firm* — David L. Hoffman; Hoffman Patent Group

(57) ABSTRACT

A container with a handle, in which a handle is engaged with a portion of the container, is manufactured by arranging the handle in a handle arrangement part, inserting a bottomed tubular preform into a cavity of a mold and performing blow molding. The mold includes an inner wall surface that forms an external shape of the container and a pressurizing member that forms a handle engaging part engaging with the handle to a portion of the container, and the pressurizing member is capable of moving between a first position which is a position at an outer side of the inner wall surface and a second position at which a portion of the inner wall surface is formed.

2 Claims, 8 Drawing Sheets

(51) Int. Cl.
    B29C 49/48    (2006.01)
    B65D 1/48     (2006.01)
    B65D 1/02     (2006.01)
    B29K 67/00    (2006.01)
    B29K 105/00   (2006.01)
    B29L 31/00    (2006.01)
    B29C 49/06    (2006.01)

(52) U.S. Cl.
    CPC ......... B65D 23/104 (2013.01); B65D 23/106 (2013.01); *B29C 49/06* (2013.01); *B29C 2049/2017* (2013.01); *B29C 2049/2039* (2013.01); *B29C 2049/2069* (2013.01); *B29C 2049/481* (2013.01); *B29C 2049/4807* (2013.01); *B29K 2067/00* (2013.01); *B29K 2105/258* (2013.01); *B29L 2031/7158* (2013.01); *B65D 2501/0036* (2013.01)

(58) Field of Classification Search
    CPC .... B29C 2049/2069; B29C 2049/2017; B65D 1/0223; B65D 23/104; B65D 1/48; B65D 23/106; B65D 2501/0036; B29K 2067/00; B29K 2105/02; B29L 2031/7158
    USPC ......................................................... 215/383
    See application file for complete search history.

(56) References Cited

U.S. PATENT DOCUMENTS

| | | | | |
|---|---|---|---|---|
| 4,952,133 A | * | 8/1990 | Hasegawa | B29C 49/20 215/383 |
| 4,964,522 A | * | 10/1990 | Umetsu | B29C 49/20 215/383 |
| 4,982,869 A | * | 1/1991 | Robbins, III | A47J 45/075 215/395 |
| 5,297,686 A | * | 3/1994 | Takeuchi | B29C 49/0073 215/396 |
| 5,338,503 A | | 8/1994 | Yanagisawa et al. | |
| 5,469,612 A | * | 11/1995 | Collette | B29C 49/54 215/396 |
| 5,637,167 A | * | 6/1997 | Krishnakumar | B29C 65/665 156/85 |
| 6,012,597 A | * | 1/2000 | Nishihara | B65D 23/106 215/398 |
| 6,444,158 B1 | * | 9/2002 | Grob | B29C 49/20 215/396 |
| 6,855,289 B2 | * | 2/2005 | Krishnakumar | B29C 49/20 264/516 |
| 7,229,587 B2 | * | 6/2007 | Anderson | B29C 49/50 264/155 |
| 7,524,181 B2 | * | 4/2009 | Chiang | B29C 49/20 425/503 |
| 7,600,655 B2 | * | 10/2009 | Agrawal | B29C 66/53245 215/396 |
| 8,613,882 B2 | * | 12/2013 | Chin | B29C 49/20 264/516 |
| 9,511,532 B2 | * | 12/2016 | Ogihara | B29C 49/20 |
| 2005/0115919 A1 | | 6/2005 | Itokawa et al. | |
| 2010/0032406 A1 | | 2/2010 | Magata | |

FOREIGN PATENT DOCUMENTS

| | | |
|---|---|---|
| JP | 5154897 A | 6/1993 |
| JP | 2003311817 A | 6/2003 |
| JP | 2005153919 A | 6/2005 |
| JP | 2006103003 A | 4/2006 |
| JP | 2008179400 A | 7/2008 |
| JP | 2011011479 A | 1/2011 |
| JP | 2011189993 A | 9/2011 |
| JP | 2011246200 A | 12/2011 |

OTHER PUBLICATIONS

Office Action, dated Oct. 11, 2017, for European Application No. 13862372.3.
European Search Report, dated Aug. 23, 2016, for European Application No. 13862372.3.
Taiwanese Office Action for Taiwanese application No. 102146065, dated Nov. 5, 2015.
Chinese Patent Office Action dated Mar. 25, 2016 for Application No. 2013800651970.
Taiwanese Patent Office Action dated Jun. 2, 2016 for Application No. 102146065.

* cited by examiner

FIG. 2
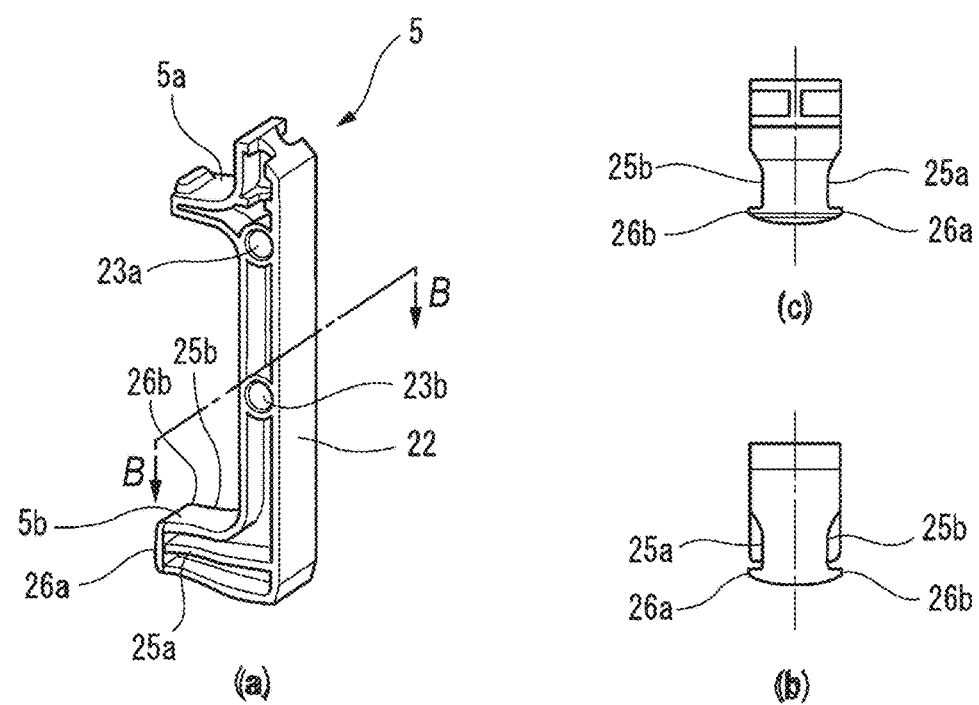
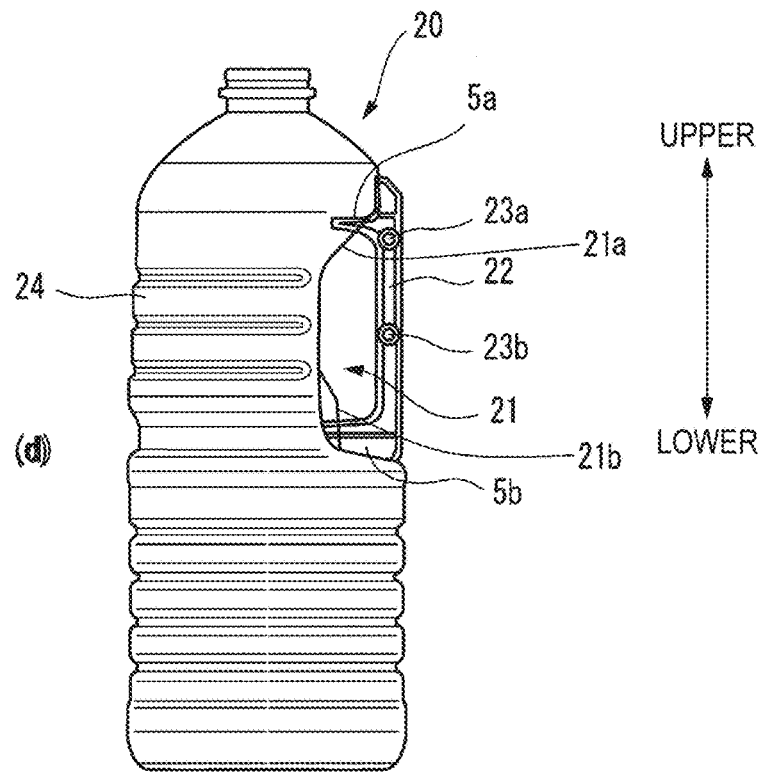

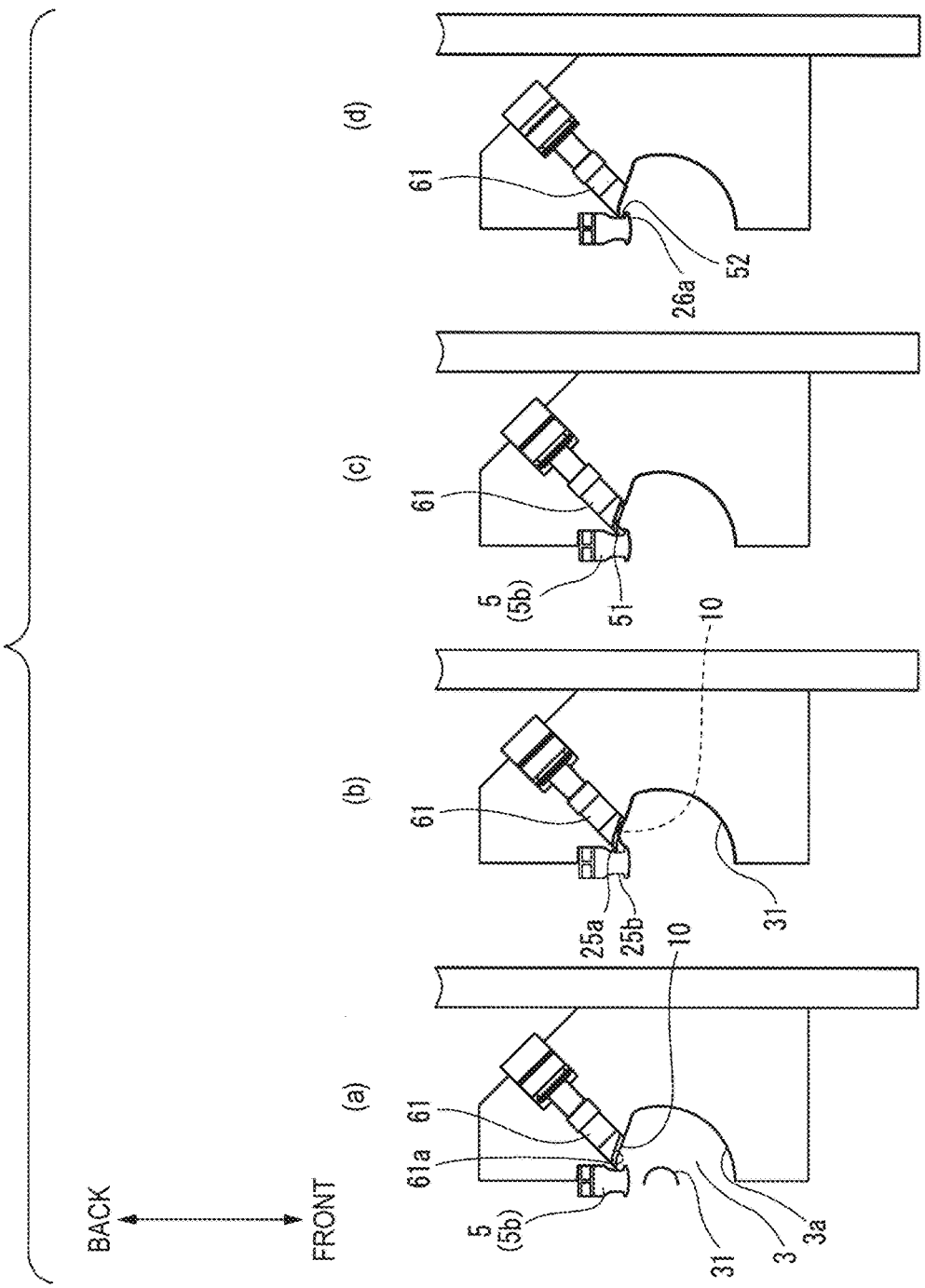

MOLD FOR CONTAINER WITH HANDLE

This is a US national stage filing of a PCT application (under 35 USC 371) PCT/JP2013/083258, having an international filing date of Dec. 11, 2013, which claims priority from JPA No. 2012-273516, filed on Dec. 14, 2012, the entirety of both of which are incorporated herein by reference.

TECHNICAL FIELD

The present invention relates to a mold for a container with a handle for manufacturing the container with the handle, a method for manufacturing the container with the handle, and the container with the handle.

BACKGROUND ART

Conventionally, a container made of synthetic resin having a handle is configured so that the handle is integrated with a recess formed in a side wall of a container body by engagement along a vertical direction of the container. In the case of manufacturing such a container, the handle is previously molded by injection molding etc. separately from the container body. Then, the molded handle is assembled to a mold and a preform is blow-molded inside the container mold. Thereby, the preform is caught by engaging parts formed to upper and lower portions of the handle, and the handle is integrated with the container body by engagement.

For example, the Patent Document 1 described below discloses a method for manufacturing a heat-resistant container with a handle in which blow molding is performed by setting a blow molding mold so that a trunk part central axis, which is at a lower side of a protrusion for handle attachment formed at an upper half part of the trunk part, is inclined to the side of the protrusion for handle attachment, and a wall surface around the protrusion for handle attachment is heat-treated.

Also, the Patent Document 2 described below discloses a plastic bottle with a handle in which the fitting strength of the handle is increased by forming the height of an upper extension part formed to an upper part of a holding part to be low, so that the handle is prevented from being detached from the bottle even when an impact is applied on the bottle by, for example, dropping the bottle on the floor.

PRIOR ART DOCUMENT

Patent Document

Patent Document 1: JP-A-2011-189993
Patent Document 2: JP-A-2008-179400

SUMMARY OF THE INVENTION

Problem that the Invention is to Solve

However, in both of the method for manufacturing the heat-resistant container with the handle described in Patent Document 1 and the plastic bottle with the handle described in Patent Document 2, when high-temperature liquid (for example, drinking water, seasoning or alcohol) is filled, there were cases the attachment strength of the handle decreases due to contraction or deformation and thus the handle tends to be detached.

An object of the invention is to provide a mold for a container with a handle capable of manufacturing the container with the handle in which the handle is hardly detached, a method for manufacturing the container with the handle, and the container with the handle.

Means for Solving the Problem

In order to solve the above-described problem, the invention provides a mold for a container with a handle, which is for manufacturing the container with the handle in which the handle is engaged with a portion of the container by arranging the handle in a handle arrangement part, inserting a bottomed tubular preform into a cavity and performing blow molding, the mold including: an inner wall surface that forms an external shape of the container, and an engaging part forming member that forms a handle engaging part engaging with the handle to a portion of the container, characterized in that: the engaging part forming member is capable of moving between a first position which is a position at an outer side of the inner wall surface and a second position at which a portion of the inner wall surface is formed.

Further, in the mold for a container with a handle of the invention, it is preferable that the engaging part forming member is connected to a heat source part for adjusting a temperature of the engaging part forming member.

Further, the invention provides a method for manufacturing a container with a handle, the method including: a blow previous stage step of arranging the handle in a handle arrangement part and inserting a bottomed tubular preform into a cavity of a mold, and a blow molding step of blowing air into the preform and expanding the preform to form the container, characterized in that: the blow molding step includes an engaging part forming step in which, when the expanding preform is expanded to a position at an outer side of an inner wall surface that forms an external shape of the container in a periphery of the handle, a handle engaging part engaging with the handle is formed to a portion of the container by moving an engaging part forming member arranged at a position at an outer side of the inner wall surface to a position at which a portion of the inner wall surface is formed so as to push back a portion of the preform that is expanded to the position at the outer side.

Further, the invention provides a container with a handle, including: a bottomed tubular container body; and the handle having a protruding engaging part engaged with the container body; characterized in that: the container body has a handle engaging part engaged with the engaging part of the handle, and at least a portion of the handle engaging part is formed at a position covered by the handle when the container with the handle is viewed from the handle side.

Further, in the container with a handle of the invention, a pressurized indentation, which is formed by an engaging part forming member of a mold for manufacturing the container with the handle, may be formed to a portion of the container body including the handle engaging part, and at least a portion of the pressurized indentation may be formed to a position covered by the handle when the container with the handle is viewed from the handle side.

Advantage of the Invention

According to the invention, the handle engaging part along a shape of the handle can be formed to the container, and the container with the handle, in which the handle is hardly detached, can be manufactured by deeply engaging the handle engaging part with the handle.

BRIEF DESCRIPTION OF THE DRAWINGS

FIG. 2(a) is a perspective view showing the handle attached to the container, FIG. 2(b) is a bottom view of the handle shown in FIG. 2(a), FIG. 2(c) is a sectional view taken along line B-B of FIG. 2(a), and FIG. 2(d) is a view showing the container with the handle.

FIGS. 8(a) to 8(d) are views showing a process of engaging the handle with the preform by a pressurizing member of a form different from the pressurizing member shown in FIG. 6.

MODE FOR CARRYING OUT THE INVENTION

One example of an embodiment of a mold for a container with a handle and a method for manufacturing the container with the handle according to the invention will hereinafter be described based on the accompanying drawings.

Figure 1:
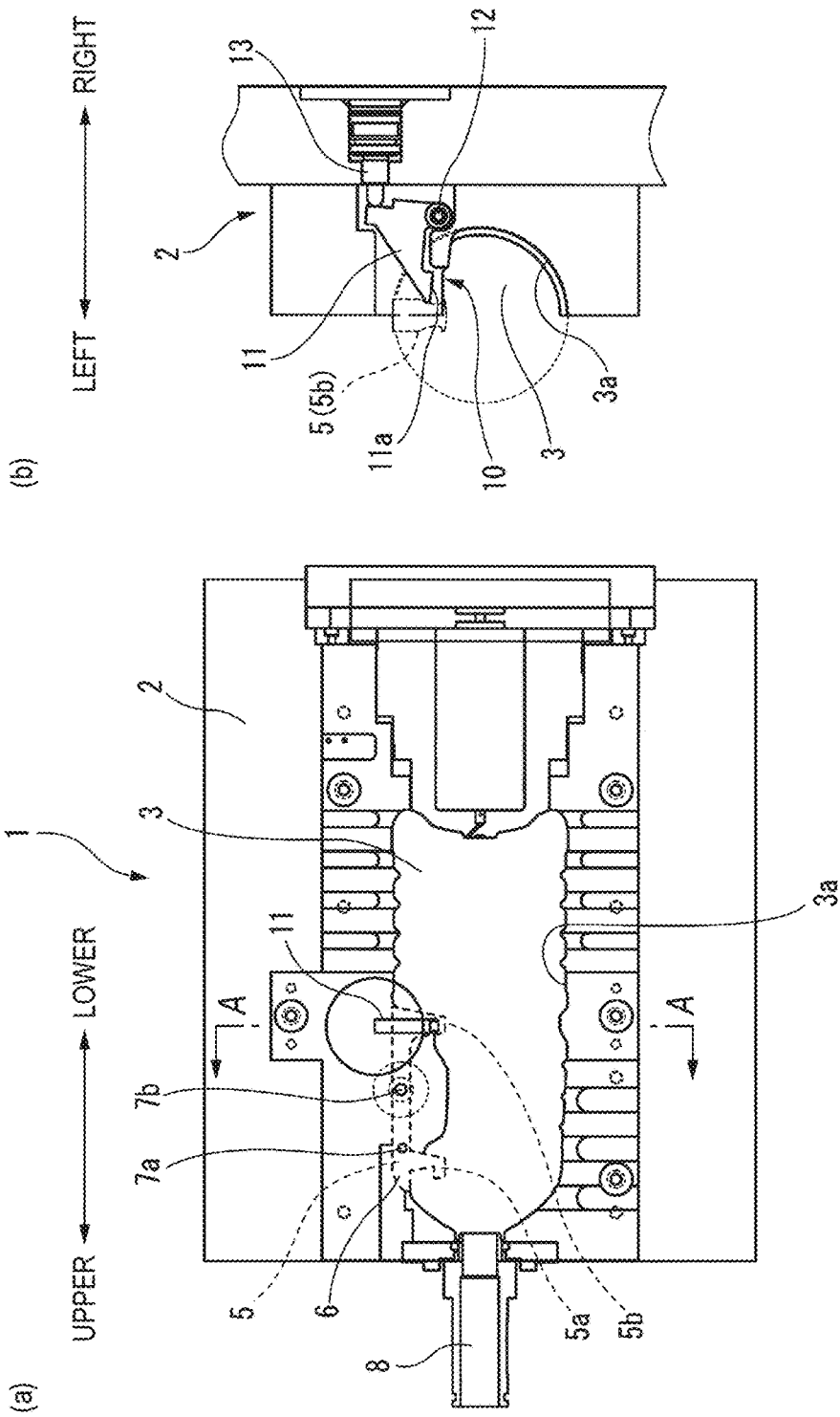
FIG. 1(a) is a view showing a mold for a container with a handle according to the invention.
FIG. 1(b) is a sectional view taken along line A-A of FIG. 1(a).

FIG. 1 shows a mold 1 for a container with a handle used for manufacturing the container with the handle.

The mold 1 for the container with the handle includes two half-split molds 2. FIG. 1(a) shows one of the half-split molds 2. The half-split mold 2 is formed with a recess (cavity) 3 having a shape of a container portion of the container with the handle. The cavity 3 has an inner wall surface 3a that forms an external shape of the container.

When a direction of a mouth part of the container (left direction in FIG. 1(a)) is defined as an upper part, a handle arrangement part 6 for arranging a handle 5 is provided to an upper part of the cavity 3. The handle arrangement part 6 has a recess shape along an external shape of the handle 5, which will be described later. In FIG. 1(a), the external shape of the handle 5 when the handle 5 is arranged in the handle arrangement part 6 is shown by a broken line. Also, fixing pins 7a, 7b for fixing the handle is provided to the handle arrangement part 6.

Also, an upper part of the half-split mold 2 (a molding part of the mouth part of the container) is provided with an insertion part 8 into which a preform is inserted.

FIG. 1(b) shows a sectional view along line A-A of FIG. 1(a). When the handle 5 is arranged in the handle arrangement part 6, distal ends of attachment arms 5a, 5b of the handle 5 are arranged in a state projected to the inside of the cavity 3, that is, the inner side than the inner wall surface 3a of the cavity 3.

FIG. 2 is a view describing the handle 5.

As shown in FIG. 2(a), the handle 5 has a gripping part 22, the upper attachment arm 5a and the lower attachment arm 5b. Also, as shown in FIG. 2(d), the handle 5 is attached to a recess 21 of a container 20 with the handle along a vertical direction of the container.

The gripping part 22 is a portion for gripping the container 20 with a hand, for example, at the time of holding the container 20 with the handle. The gripping part 22 is formed with holding and positioning holes 23a, 23b into which the fixing pins 7a, 7b (see FIG. 1(a)) of the handle arrangement part 6 are inserted.

The upper attachment arm 5a of the handle 5 projects from the vicinity of the upper end of the gripping part 22 toward the inner side of a container body 24. The lower attachment arm 5b of the handle 5 projects from the vicinity of the lower end of the gripping part 22 toward the inner side of the container body 24. The upper attachment arm 5a and the lower attachment arm 5b are respectively engaged with an upper part 21a and a lower part 21b of the recess 21 of the container body 24.

As shown in FIGS. 2(a) to 2(c), both sides of the lower attachment arm 5b of the handle 5 are provided with curved recesses 25a, 25b formed by narrowing a width of the lower attachment arm 5b in a curved shape. The distal end of the lower attachment arm 5b is formed with protruding engaging parts 26a, 26b engaged with the container body 24. In a state in which the handle 5 with such a configuration is attached to the container body 24, space for inserting a hand and fingers is formed between the gripping part 22 and a wall surface part forming the recess 21 at the upper side of the container body 24.

Returning to FIG. 1(b), explanation of the half-split mold 2 will be continued. In FIG. 1(b), the lower attachment arm 5b of the handle 5 is shown by a broken line.

In the half-split mold 2, an opened space 10 in which the inner wall surface 3a is not present is formed in the circumference (periphery) of a position in which the lower attachment arm 5b is arranged. This space 10 is a region in which the inner wall surface 3a forming the cavity 3 is partially absent in both of the left and right sides of the lower attachment arm 5b.

The half-split mold 2 is provided with a pressurizing member (one example of an engaging part forming member) 11 configured to be rotatable around a rotational shaft 12. Also, the back surface (right surface in FIG. 1(b)) of the pressurizing member 11 is provided with an expandable oil-hydraulic piston member 13 in contact with the back surface of the pressurizing member 11, and the pressurizing member 11 is configured so as to rotate around the rotational shaft 12 by being pressed by expansion and contraction of this piston member 13.

A pressurizing surface 11a is formed to the distal end of the pressurizing member 11. A shape and a position of the pressurizing member 11 are set so that this pressurizing surface 11a closes the space 10 formed in the circumference of the lower attachment arm 5b of the handle 5 when the pressurizing member 11 is rotated around the rotational shaft 12. That is, the pressurizing member 11 and the space 10 have a nest structure in which the pressurizing surface 11a of the pressurizing member 11 enters the space 10 so as to close the space 10.

The pressurizing member 11 is set so that the pressurizing surface 11a is arranged in a position at the outer side the inner wall surface 3a (one example of a first position) at the time of non-driving of the pressurizing member 11. At this time, the piston member 13 is controlled in a contracted state, and the pressurizing member 11 is rotated around the rotational shaft 12 clockwise when the half-split mold 2 is viewed from the downward side (viewed from a direction illustrated in FIG. 1(b)), and is maintained at a position in a state of abutting on the piston member 13 as shown in FIG. 1(b).

On the other hand, the pressurizing member 11 is set so that the pressurizing surface 11a is arranged in a position at which a portion of the inner wall surface 3a is formed (one example of a second position) at the time of driving of the pressurizing member 11. At this time, the piston member 13 is controlled in an expanded state. Then, the pressurizing member 11 is pressed by this expanded piston member 13 and is rotated around the rotational shaft 12 counterclockwise when the half-split mold 2 is viewed from the downward side (viewed from the direction illustrated in FIG. 1(b)), and is maintained at a position in a state in which the pressurizing surface 11a closes the space 10 formed in the circumference of the lower attachment arm 5b.

Also, the pressurizing member 11 is connected to a heat source part (not shown) capable of adjusting a temperature of the pressurizing surface 11a. This heat source part has a heat medium, and when the temperature of the pressurizing surface 11a is increased, the heat medium whose temperature is increased to a predetermined temperature by a temperature controller is supplied to the pressurizing member 11, and the temperature of the pressurizing surface 11a is increased to the predetermined temperature.

Next, a method for manufacturing the container with the handle by using the mold 1 for the container with the handle will be described based on FIGS. 3 to 6.

Figure 3:
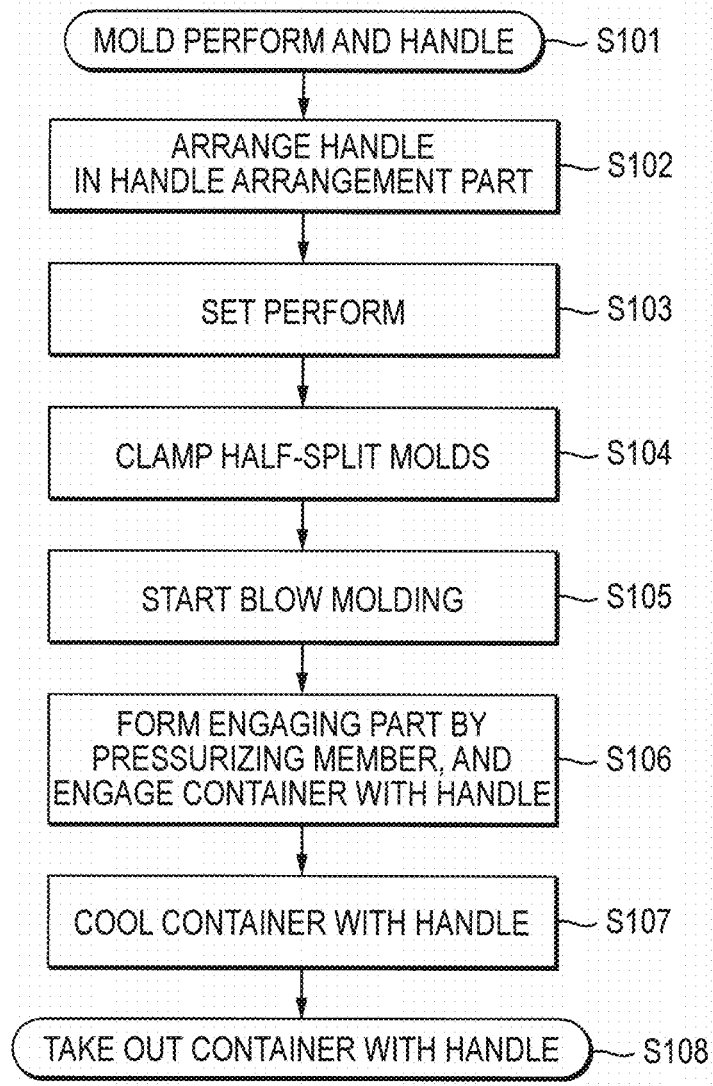
FIG. 3 is a flowchart showing a procedure for manufacturing the container with the handle.
Figure 4:
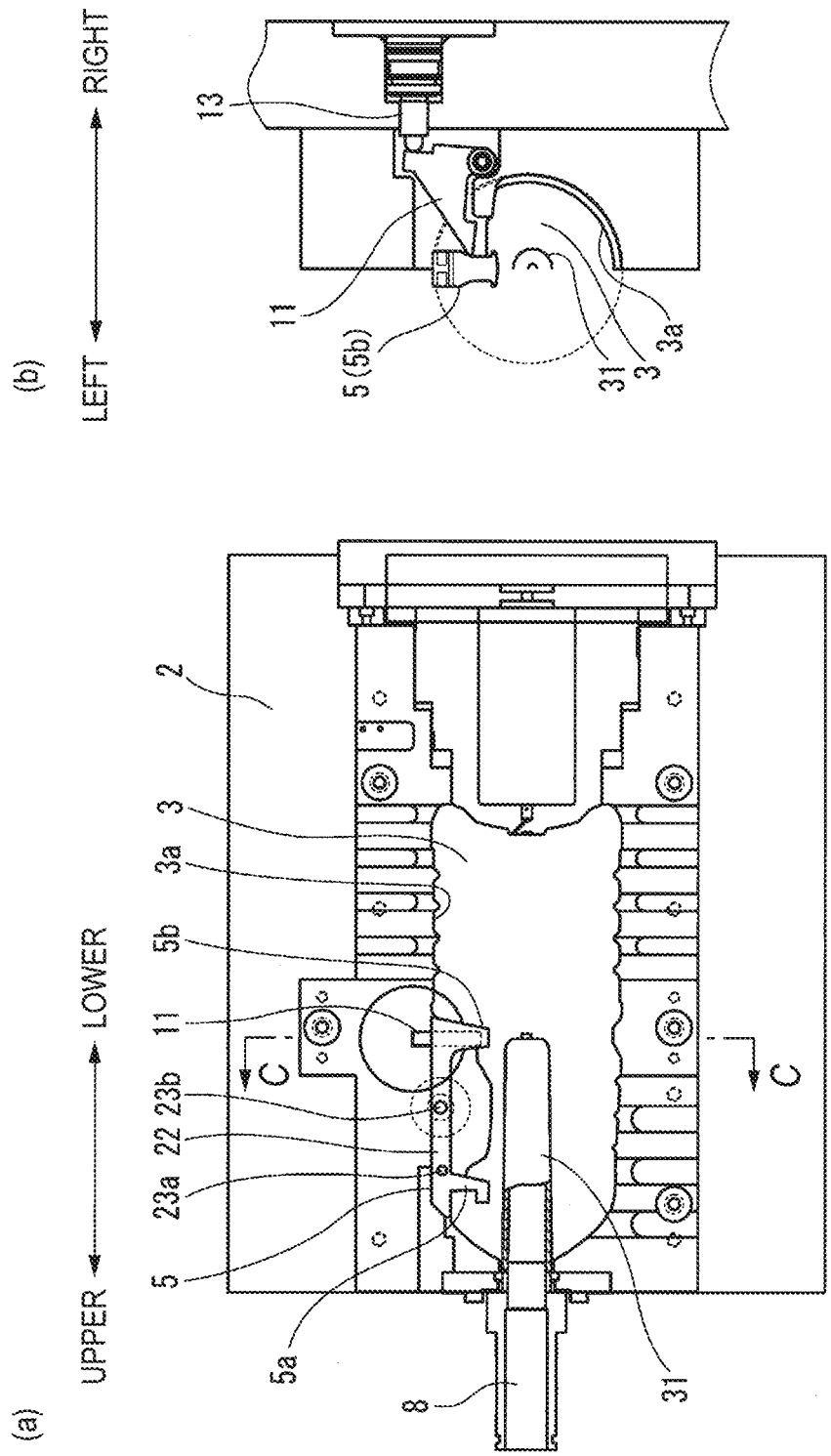
FIG. 4(a) is a view showing a state in which the handle is incorporated into the mold for the container with the handle and a preform is inserted.
FIG. 4(b) is a sectional view taken along line C-C of FIG. 4(a).

As shown in a flowchart of FIG. 3, a bottomed tubular preform 31 is formed in advance by injection molding using a material such as a polyester resin. Also, the handle 5 is formed by injection molding using a polyester resin and the like similarly (step S101).

Subsequently, the formed handle 5 is arranged to the handle arrangement part 6 of the mold 1 for the container with the handle (step S102: one example of a blow previous stage step).

Also, the preform 31, which is to become the container body 24, is inserted and set into the cavity 3 of the half-split mold 2 (step S103: one example of the blow previous stage step). In a state in which the preform 31 keeps the amount of heat at the time of injection molding and is at a proper temperature for blow molding, or in a state in which the preform 31 is heated to the proper temperature of blow molding and the temperature of the preform 31 is adjusted after the preform 31 is once cooled to room temperature after injection molding, the preform 31 is inserted into the cavity 3. The proper temperature is set at 100° C. to 120° C. Here, step S102 and step S103 may be simultaneously performed, that is, the handle 5 and the preform 31 may be simultaneously set in the mold 1.

FIGS. 4(a) and 4(b) show a state in which the handle 5 is arranged in the handle arrangement part 6 of the half-split mold 2 and the preform 31 is inserted and set into the cavity 3 from the insertion part 8.

The handle 5 is fixed by inserting the fixing pins 7a, 7b of the handle arrangement part 6 into the holding and positioning holes 23a, 23b formed in the gripping part 22. The distal ends of the upper attachment arm 5a and the lower attachment arm 5b of the handle 5 are arranged in a state of projecting in and entering inside the inside of the cavity 3 from the inner wall surface 3a of the cavity 3.

Also, the preform 31 is set so as to extend to the inside of the cavity 3 straight along the central axis of the cavity 3 in a vertical direction. Also, the pressurizing surface 11a of the pressurizing member 11 is arranged at a position at the outer side of the inner wall surface 3a. In this manner, the handle 5 and the preform 31 are set in the half-split mold 2.

Then, as shown in FIG. 3, after the handle 5 and the preform 31 are set, the half-split molds 2, 2 are clamped (step S104).

After the half-split molds 2, 2 are clamped, blow molding for forming the container 20 with the handle is started (step S105). The blow molding is performed by blowing high-pressure air into the preform 31 set inside the cavity 3.

Figure 5:
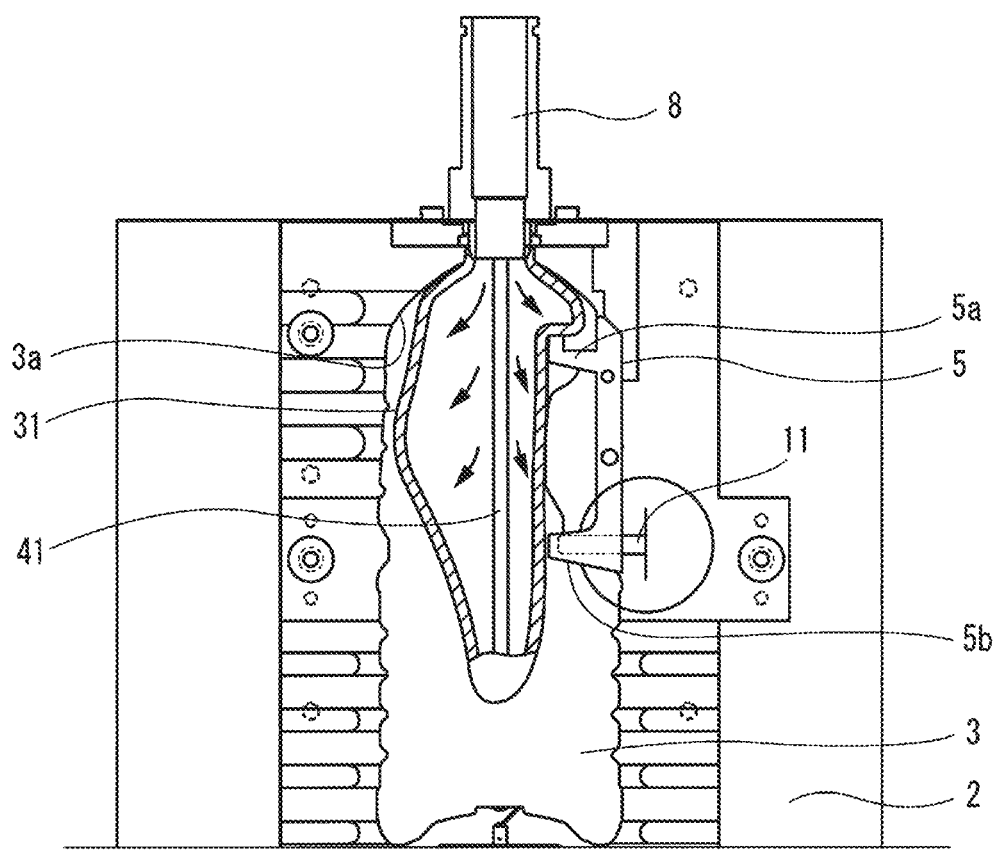
FIG. 5 is a view showing one process of blow molding of the preform.
Figure 6:
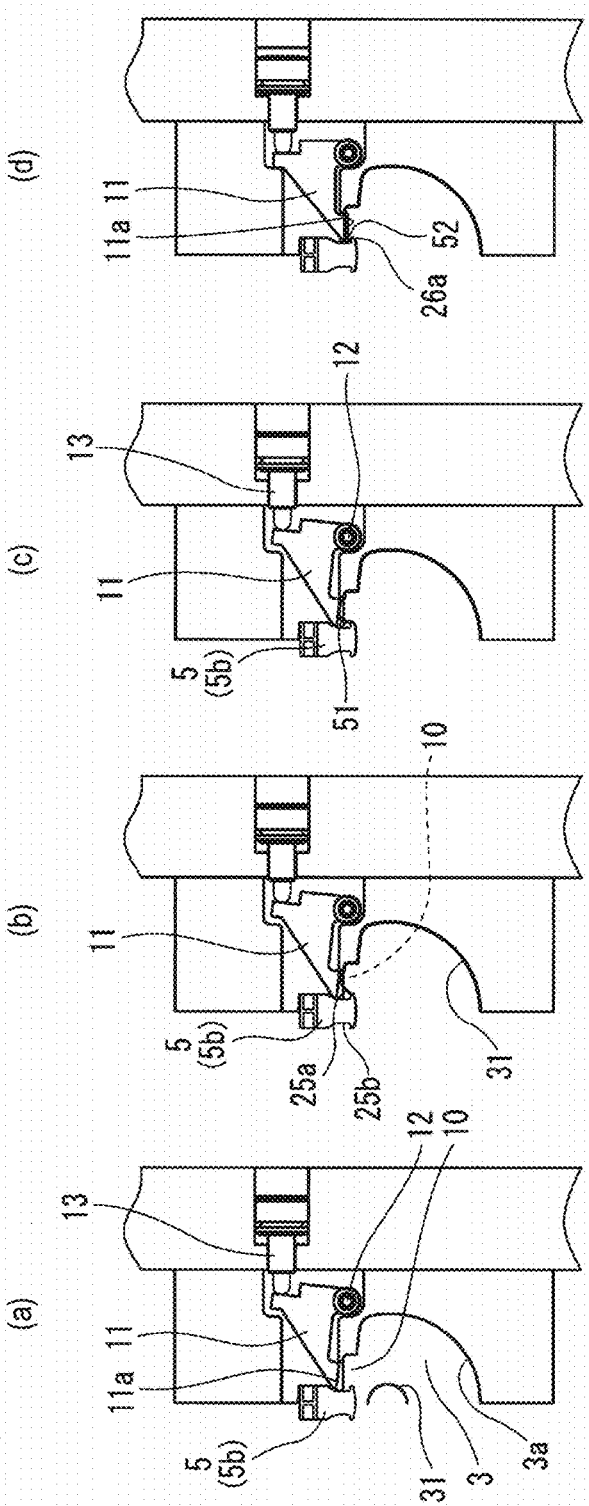
FIGS. 6(a) to 6(d) are views showing a process of engaging the handle with the preform by pressurization by a pressurizing member during blow molding.

FIG. 5 shows one process of the blow molding in which the air is blown into the preform 31 to expand the preform 31.

A stretching rod 41 is inserted into the preform 31 from the insertion part 8 and this stretching rod 41 is downwardly moved to thereby stretch the preform 31 in the vertical central axis direction. Also, the high-pressure air introduced from the distal end of the insertion part 8 expands the preform 31 in a left-right direction.

At this time, at the same time as a downward movement of the stretching rod 41 or after the downward movement, the air is introduced from the distal end of the insertion part 8 to stretch the preform 31. Consequently, the upper portion of the preform 31 expands in the left-right direction earlier than the lower portion thereof, and abuts on the inner wall surface 3a of the cavity 3 and sticks to the inner wall surface 3a. The expanded preform 31 contacts with the upper attachment arm 5a of the handle 5 so as to cover the upper attachment arm 5a from the upward side and engages with the upper attachment arm 5a, thereby forming the upper part 21a (see FIG. 2(d)) of the recess 21 of the container body 24. Then, the air is introduced and the preform 31 is further expanded and thereby, the preform 31 contacts with the lower attachment arm 5b so as to cover the lower attachment arm 5b and engages with the lower attachment arm 5b, and also, the lower part 21b of the recess 21 of the container body 24 and the whole external shape of the container body 24 are formed. In this manner, the preform 31 is expanded.

Then, as shown in FIG. 3, a handle engaging part engaging with the lower attachment arm 5b of the handle 5 is formed to the container body 24 in order to reliably engage the handle 5 with the expanded preform 31 (container body 24) (step S106). The handle engaging part is formed by pressurizing and deforming a portion of the expanded preform by the pressurizing member 11.

Here, a process of engaging the handle 5 with the expanded preform 31 by the pressurizing member 11 will be described with reference to FIGS. 6(a) to 6(d).

FIG. 6(a) shows a state in which blowing is not started. The handle 5 and the preform 31 are set at a predetermined position, and the pressurizing surface 11a of the pressurizing member 11 is arranged at a position at the outer side of the inner wall surface 3a (one example of a first position). Also, the space 10 in which the inner wall surface 3a is absent is formed in the circumference of the lower attachment arm 5b of the set handle 5.

FIG. 6(b) shows a state in which the preform 31 is expanded by the blowing and the expanded preform 31 sticks to the inner wall surface 3a of the cavity 3 and the external shape of the container body 24 is being formed. Also, the expanded preform 31 has entered into the space 10 in which the inner wall surface 3a is absent. However, at this stage, the preform 31 has not entered into the curved recess 25a of the lower attachment arm 5b. At this time, the pressurizing surface 11a of the pressurizing member 11 remains arranged at the position at the outer side of the inner wall surface 3a.

FIG. 6(c) shows a state in which the preform 31 expanded by the blowing and having entered into the space 10 has expanded to the outer side than a position which is to become the external shape of the container body 24. The expanded preform 31 reaches a position contacting with the pressurizing surface 11a of the pressurizing member 11 arranged at the outer side of the inner wall surface 3a. At this time, the oil-hydraulic piston member 13 is driven and the pressurizing member 11 starts rotational operation (counter-clockwise in FIG. 6(c)). Here, at the time of starting this operation, the expanded preform 31 having entered into the space 10 has not entered into the curved recess 25a of the lower attachment arm 5b, and a gap 51 is present between the curved recess 25a and the preform 31.

In FIG. 6(c), a timing at which the pressurizing member 11 is driven can be set as a time when a predetermined time has elapsed after the blow molding has started. The predetermined time may be set as a time when the expanded preform 31 is expanded to the outer side of the external shape of the container body 24 in the space 10, and the expanded preform contacts with (reaches) the pressurizing surface 11a of the pressurizing member 11. Also, the predetermined time may be set as a time when the expanded preform 31 is expanded to (reaches) the outer side beyond a position of the external shape of the container. These predetermined times could be obtained experimentally.

FIG. 6(d) shows a state in which the container body 24 (preform 31) is engaged with the handle 5 by the pressurizing member 11. The operation of the pressurizing member 11 moves the pressurizing surface 11a to a position in which a portion of the inner wall surface 3a of the cavity 3 (portion of the space 10 in which the inner wall surface 3a is absent) is formed (one example of a second position). That is, the pressurizing surface 11a has moved to a position of the external shape of the container body 24.

By this movement of the pressurizing surface 11a, the portion expanded to the outer side than the external shape of the container body 24 in the expanded preform 31 is pushed back to the position of the external shape of the container body 24. The preform 31 pushed back is deformed by pressurization from the pressurizing surface 11a, and the portion abutting on the pressurizing surface 11a is formed into a shape of the external shape of the container body 24.

Also, the preform 31 pushed back is pushed into the curved recess 25a of the lower attachment arm 5b, and enters the gap 51 present in the circumference of the curved recess 25a in FIG. 6(c). At the time of starting movement of the pressurizing surface 11a, the pressurizing surface 11a is inclined (diagonally left up in FIG. 6(c)) as shown in FIG. 6(c), and rotational movement of the pressurizing surface 11a gradually pushes the preform 31 in a direction of the gap 51.

Accordingly, the preform 31 at the side of the curved recess 25a is deformed along a shape of the curved recess 25a, and its portion is formed with a handle engaging part 52 capable of being engaged with the protruding engaging part 26a formed on the distal end of the lower attachment arm 5b. That is, a pressure is applied to the preform 31 from the pressurizing member 11 to thereby form the handle engaging part 52 engaging with the engaging part 26a of the lower attachment arm 5b.

As shown in FIG. 3, when the pressurizing operation by the pressurizing member 11 is completed, introduction of air from the insertion part 8 is stopped. Here, steps S105 and S106 described above are one example of a blow molding step, and step S106 is also one example of an engaging part forming step.

After the introduction of air is stopped, the preform 31 is maintained in a state brought into close contact with the inner wall surface 3a of the cavity 3, and is cooled so as to become a final shape of the container 20 with the handle (step S107). Thereafter, the air is discharged and the molds are opened, and the container 20 with the handle, to which the handle 5 is engaged, is taken out (step S108).

In the mold for the container with the handle and the method for manufacturing the container with the handle of the embodiment as described above, the pressurizing surface 11a of the pressurizing member 11 can be moved between the position at an outer side of the inner wall surface 3a and the position at which a portion of the inner wall surface 3a is formed. As a result, the preform 31 can be expanded to the outer side than the external shape of the container body 24 by arranging the pressurizing surface 11a of the pressurizing member 11 to the position at the outer side of the inner wall surface 3a when the preform 31 is expanded by blow molding. Then, by moving the pressurizing surface 11a of the pressurizing member 11 to the position at which a portion of the inner wall surface 3a is formed, the portion of the expanded preform 31 expanded to the outer side of the external shape of the container body 24 can be pushed back to the position of the external shape of the container body 24. Accordingly, the preform 31 can be pushed in a direction of the curved recess 25a of the handle 5 (lower attachment arm 5b), and the handle engaging part 52 corresponding to a shape of the curved recess 25a can be formed to the preform 31 (container body 24). Hence, the handle engaging part 52 formed to the container body 24 can be deeply engaged with the handle 5 (particularly, the engaging part 26a formed on the distal end of the lower attachment arm 5b) with no gap, and the container 20 with the handle in which the handle 5 is hardly detached and having a high attachment strength can be manufactured.

Also, since the pressurizing surface 11a of the pressurizing member 11 is arranged in the outside beyond the inner wall surface 3a and the preform 31 is expanded to the outside beyond the external shape of the container body 24, the preform 31 can surely be caught in a gap, which the preform 31 cannot enter due to narrowness until now, of the lower attachment arm 5b of the handle 5. Hence, the container 20 including the handle 5 which has a small backlash and is resistant to being detached can be manufactured.

Also, since the timing at which the pressurizing member 11 is driven can be set as a time when a predetermined time has elapsed since the blow molding has started, after the predetermined time is once obtained experimentally, the containers can efficiently be mass-manufactured under a condition of manufacture with high reproducibility.

Also, since the container 20 with the handle in which the handle 5 is hardly detached and having the high attachment strength can be efficiently manufactured, the container 20 can be applied to a high-cycle apparatus incapable of securing a sufficient blow time in a manufacturing process.

Figure 7:
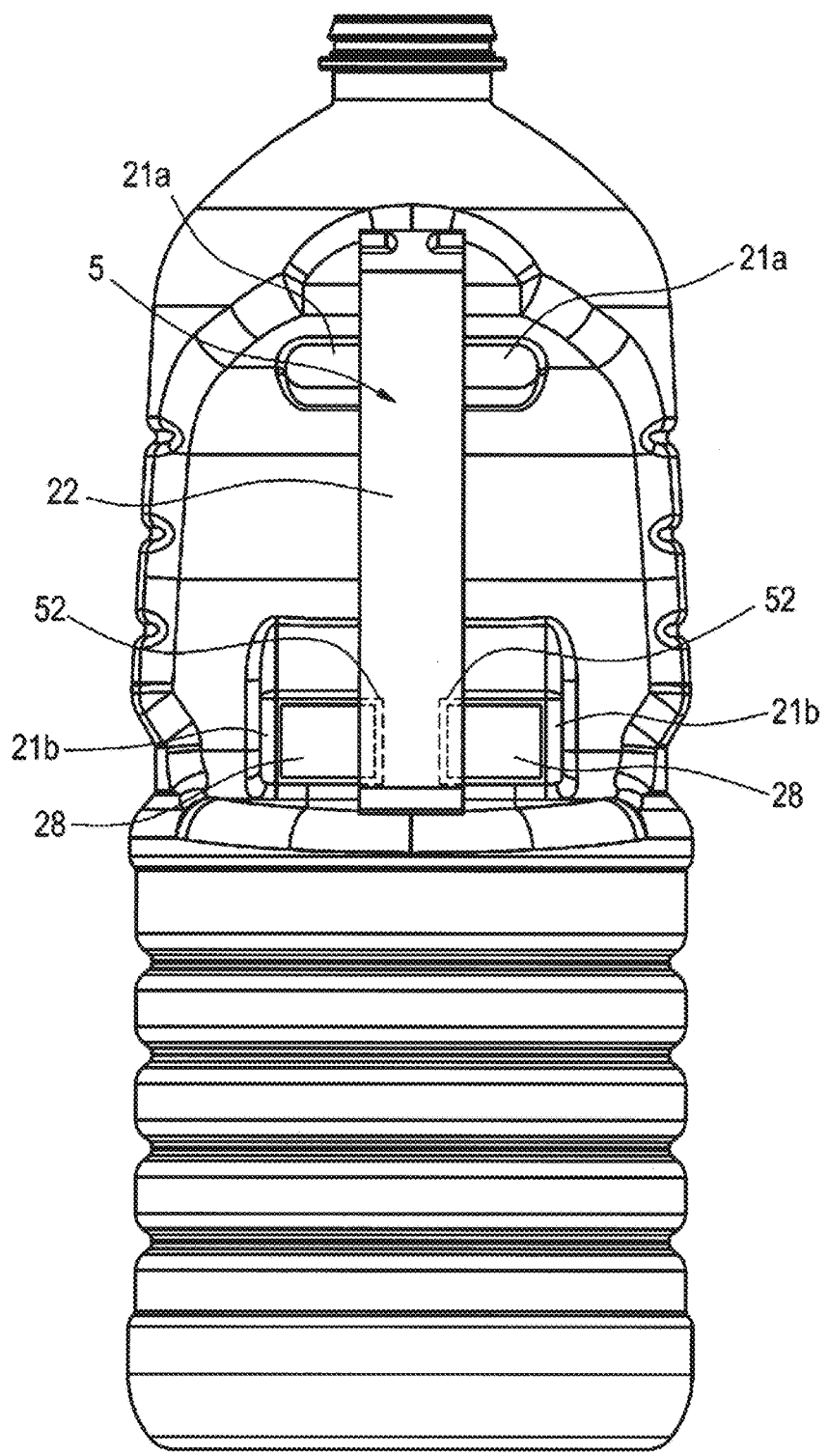
FIG. 7 is a view showing the container to which the handle is attached.

Also, as a result of manufacturing the container 20 with the handle using the mold 2 having the pressurizing member 11 as described above, a pressurized indentation 28 capable of being observed by a measuring device or visually may be formed to a portion of the lower part 21b of the recess 21 of the container body 24 as shown in FIG. 7. The pressurized indentation 28 is formed at the time when the expanded portion of the preform 31 is pressurized and deformed by the pressurizing surface 11a of the pressurizing member 11 in step S106 described above. At least a portion of the pressurized indentation 28 is formed to the handle engaging part 52. The pressurizing surface 11a includes a flat surface at a position range opposed to at least the engaging parts 26a, 26b of the handle 5. As a result, the pressurized indentation 28 has a flat surface structure extending in at least a vertical direction at the side of the curved recesses 25a, 25b of the handle 5. In addition, in order to further increase the attachment strength (assembly strength) of the handle 5, it is desirable to provide a wide flat surface to the pressurizing surface 11a. Hence, the pressurized indentation 28 in the present example is formed as the flat surface structure with a depressed shape (recessed shape) having a wide area in a rectangular shape and extending on the left, right, top and bottom of the engaging parts 26a, 26b upper to the projecting lower part 21b.

Also, as shown in FIG. 7, at least a portion of the handle engaging part 52 is formed at a position covered by the gripping part 22 of the handle 5 when the container 20 with the handle is viewed from the handle side. Also, at least a portion of the pressurized indentation 28 formed to the lower part 21b of the container body 24 is formed to the position covered by the gripping part 22 of the handle 5 when the container 20 with the handle is viewed from the handle side. Thus, in the container 20 with the handle, the handle engaging part 52 is mutually deeply engaged with the lower attachment arm 5b of the handle 5. Also, a portion of the upper part 21a of the recess 21 of the container body 24 is engaged with the upper attachment arm 5a (see FIG. 2) of the handle 5 so as to cover the upper attachment arm 5a from the upward side. The handle 5 attached in this manner is hardly detached and has a high attachment strength. As a result, even when the container body 24 is filled with high-temperature liquid (for example, drinking water, seasoning or alcohol), the handle 5 has a small backlash and is also hardly detached.

Next, FIG. 8 shows a modified example of the pressurizing member. A pressurizing member 61 shown in FIG. 8 is a piston type and differs from the pressurizing member 11 of a rotary type. FIGS. 8(a) to 8(d) show a process of engaging a handle 5 with a container body 24 (preform 31) by the pressurizing member 61. Since each of the members other than the pressurizing member has the same configuration in the case of comparison with FIGS. 6(a) to 6(d), the same reference numerals are assigned and the explanation is omitted.

The pressurizing member 61 is installed toward a space 10 in which an inner wall surface 3a formed in the circumference of a lower attachment arm 5b is not present.

A pressurizing surface 61a of the pressurizing member 61 is arranged at a position at the outer side of the inner wall surface 3a (one example of a first position) in a retracted state. On the other hand, the pressurizing surface 61a is moved to a position at which an external shape of the container body 24 is formed (one example of a second position) in a projected state. When the expanded preform 31 contacts with the pressurizing surface 61a (a time shown in FIG. 8(c)), the pressurizing member 61 is driven and projected.

The pressurizing surface 61a of the projected pressurizing member 61 is moved to the position of the external shape of the container body 24 to close the space 10. Accordingly, like the pressurizing member 11 of FIG. 6, the expanded preform 31 is pushed back, and a handle engaging part 52 engaged with a curved recess 25a (particularly, an engaging part 26a formed on the distal end of the lower attachment arm 5b) of the lower attachment arm 5b is formed.

Also, in the pressurizing surface 61a of the pressurizing member 61, the distal end portion of the side near to the handle 5 is formed in a state slightly crooked toward the distal end of the handle 5. By such a configuration, the pressurizing member 61 can more surely push the preform 31 into the side (rear side (back side)) of the engaging part 26a) near to the handle 5 by the distal end portion of the crooked pressurizing surface 61a, and decrease a gap with the handle 5.

Here, in the embodiment described above, only the half-split mold 2 of one side is described, but in the half-split mold 2 of the other side, the pressurizing members 11, 61 are similarly formed and similar blow molding is performed. By this configuration, the handle 5 is fixed by the handle engaging parts 52 formed by the pressurizing members 11, 61 from both of the left and right sides, and particularly, the handle 5 becomes hardly detached in a transverse direction.

Also, the pressurizing surfaces 11a, 61a in contact with the expanded portion of the preform 31 may be heat-treated by operating a heat source part (not shown) connected to the pressurizing member 11 and thereby increasing temperatures of the pressurizing surfaces 11a, 61a (increased to, for example, about 100° C.). When the temperatures of the pressurizing surfaces 11a, 61a are low, since the expanded portion of the preform 31 is cooled and becomes hardly deformed after the expanded portion of the preform 31 contacts with the pressurizing surfaces 11a, 61a, it becomes necessary to control timing at which the pressurizing members 11, 61 are driven with high accuracy. However, by increasing the temperatures of the pressurizing surfaces 11a, 61a, the expanded portion of the preform can be deformed in a desired shape even when the timing at which the pressurizing members 11, 61 are driven includes some error.

Also, the handle engaging part 52 engaged with the distal end of the lower attachment arm 5b (the curved parts 25a, 25b, particularly, the engaging parts 26a, 26b) can be heated-treated by increasing the temperatures of the pressurizing surfaces 11a, 61a. Hence, heat resistance of the handle engaging part 52 can be improved, and a decrease in handle attachment strength due to contraction or deformation in the case of being filled with high-temperature seasoning, alcohol, etc., can be prevented to manufacture the container 20 with the handle in which the handle 5 is hardly detached.

The invention has been described above in detail with reference to the specific embodiment, but it is apparent to those skilled in the art that various changes or modifications can be made without departing from the spirit and scope of the invention.

The invention has been described in detail with reference to the specific embodiment, but it is apparent to those skilled in the art that various changes or modifications can be made without departing from the spirit and scope of the invention.

The present application is based on Japanese patent application (patent application No. 2012-273516) filed on Dec. 14, 2012, and the contents of the patent application are hereby incorporated by reference.

DESCRIPTION OF REFERENCE NUMERALS AND SIGNS

1: MOLD FOR CONTAINER WITH HANDLE
2: HALF-SPLIT MOLD
3: RECESS (CAVITY)
3a: INNER WALL SURFACE
5: HANDLE
5a: UPPER ATTACHMENT ARM
5b: LOWER ATTACHMENT ARM
6: HANDLE ARRANGEMENT PART
7a,7b: FIXING PIN
8: INSERTION PART
10: SPACE 11,61: PRESSURIZING MEMBER (ENGAGING PART FORMING PART)
11a,61a: PRESSURIZING SURFACE
13: PISTON MEMBER
20: CONTAINER WITH HANDLE
21: RECESS
22: GRIPPING PART
24: CONTAINER BODY
25a,25b: CURVED RECESS
26a,26b: ENGAGING PART
28: PRESSURIZED INDENTATION
41: STRETCHING ROD
51: GAP
52: HANDLE ENGAGING PART

The invention claimed is:

1. A mold for a container with a handle including two engaging parts protruding in a horizontal direction, which is for manufacturing the container with the handle in which the handle is engaged with a portion of the container by arranging the handle in a handle arrangement part, inserting a bottomed tubular preform into a cavity and performing blow molding, the mold comprising:
an inner wall surface that forms an external shape of the container, and two engaging part forming members which are located at a position corresponding to the two engaging parts of the handle and form handle engaging parts engaging with the two engaging parts of the handle to a portion of the container,
wherein the engaging part forming member is capable of moving between a first position which is a position at an outer side of the inner wall surface and a second position at which a portion of the inner wall surface is formed,
wherein the mold includes two half-split molds, each of the half-split molds including one of the engaging part forming members,
wherein the handle includes an upper attachment arm and a lower attachment arm,
wherein each side of the lower attachment arm is provided with a curved recess formed by narrowing a width of the lower attachment arm in a curved shape, and
wherein the engaging part forming members are configured to rotate around a rotational shaft, and further configured such that in response to rotating the engaging part forming members around the rotational shaft, the preform is pushed towards the curved recesses and enters gaps in a circumference of the curved recesses.

2. The mold for a container with a handle according to claim 1,
wherein at least one of the engaging part forming members is connected to a heat source part for adjusting a temperature of the engaging part forming member.

* * * * *